US011807249B2

(12) United States Patent
Nasu et al.

(10) Patent No.: US 11,807,249 B2
(45) Date of Patent: Nov. 7, 2023

(54) VEHICLE MOTION STATE ESTIMATION DEVICE, VEHICLE MOTION STATE ESTIMATION METHOD, AND VEHICLE

(71) Applicant: Hitachi Astemo, Ltd., Hitachinaka (JP)

(72) Inventors: Shingo Nasu, Tokyo (JP); Shinji Seto, Tokyo (JP); Nobuyuki Ichimaru, Hitachinaka (JP); Ryusuke Hirao, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 204 days.

(21) Appl. No.: 17/311,858

(22) PCT Filed: Aug. 19, 2019

(86) PCT No.: PCT/JP2019/032247
§ 371 (c)(1),
(2) Date: Jun. 8, 2021

(87) PCT Pub. No.: WO2020/129298
PCT Pub. Date: Jun. 25, 2020

(65) Prior Publication Data
US 2022/0017105 A1 Jan. 20, 2022

(30) Foreign Application Priority Data

Dec. 21, 2018 (JP) ................. 2018-239248

(51) Int. Cl.
*B60W 40/10* (2012.01)
*B60W 30/18* (2012.01)
*B60W 40/109* (2012.01)

(52) U.S. Cl.
CPC .......... *B60W 40/109* (2013.01); *B60W 30/18* (2013.01); *B60W 2510/22* (2013.01);
(Continued)

(58) Field of Classification Search
CPC .............. B60W 40/109; B60W 30/18; B60W 2520/125; B60W 2520/14; B60W 2520/28
See application file for complete search history.

(56) References Cited

U.S. PATENT DOCUMENTS

2005/0049761 A1* 3/2005 Kataoka ................ B60W 10/18
702/56
2005/0273241 A1* 12/2005 Tsukasaki ............... B60T 8/172
701/79
(Continued)

FOREIGN PATENT DOCUMENTS

JP 2007-008373 A 1/2007
JP 2012-030760 A 2/2012
(Continued)

OTHER PUBLICATIONS

International Search Report with English translation and Written Opinion issued in corresponding application No. PCT/JP2019/032247 dated Oct. 21, 2019.
Office Action issued in corresponding Korean Patent Application No. 10-2021-7018609 dated Oct. 24, 2022 with English Machine Translation (9 pages).

*Primary Examiner* — Kira Nguyen
(74) *Attorney, Agent, or Firm* — Foley & Lardner LLP (57) ABSTRACT

An object of the present invention is to provide a vehicle motion state estimation device and method that can estimate the vertical motion state amount with high accuracy by taking into consideration vertical force in which the frictional force acting in the front-rear direction or lateral direction of the wheel acts on the vehicle body due to the geometry of suspension. A vehicle motion state estimation device in a vehicle in which a wheel and a vehicle body are coupled via a suspension, the vehicle motion state estimation device including: a vertical motion-caused wheel speed component estimation unit that estimates a wheel speed component caused by vertical motion of the vehicle; a
(Continued)

vertical force estimation unit that calculates vertical force in which frictional force of the wheel caused by motion of the vehicle acts on the vehicle body by geometry of the suspension; and a vertical motion estimation unit that estimates a state amount of vertical motion of a vehicle, in which the vertical motion estimation unit estimates a state amount of vertical motion of the vehicle based on a wheel speed component from the vertical motion-caused wheel speed component estimation unit and vertical force acting on the vehicle body from the vertical force estimation unit.

9 Claims, 7 Drawing Sheets (52) U.S. Cl.
CPC ... *B60W 2520/125* (2013.01); *B60W 2520/14* (2013.01); *B60W 2520/28* (2013.01)

(56) References Cited

U.S. PATENT DOCUMENTS

| | | |
|---|---|---|
| 2013/0231838 A1 | 9/2013 | Shiozawa |
| 2015/0032333 A1* | 1/2015 | Nakatsu ............ B60W 10/184 |
| | | 701/37 |
| 2015/0081170 A1 | 3/2015 | Kikuchi |
| 2015/0105978 A1* | 4/2015 | Nakatsu ................. B60L 7/00 |
| | | 701/37 |

FOREIGN PATENT DOCUMENTS

| | | |
|---|---|---|
| JP | 2012-047553 A | 3/2012 |
| JP | 2015-132182 A | 7/2015 |
| WO | WO-2013/172282 A1 | 11/2013 |

* cited by examiner

VEHICLE MOTION STATE ESTIMATION DEVICE, VEHICLE MOTION STATE ESTIMATION METHOD, AND VEHICLE

TECHNICAL FIELD

The present invention relates to estimating a state amount of vehicle motion, and more particularly relates to a vehicle motion state estimation device and a vehicle motion state estimation method that estimate a vertical motion state amount of a vehicle, and a vehicle.

BACKGROUND ART

As a method of acquiring the vertical motion state amount of a vehicle, there is known a direct detection method using a dedicated sensor such as a vehicle height sensor or a vertical acceleration sensor, in addition to an estimation method not using a dedicated sensor but using a vehicle dynamics model from a generally vehicle-mounted sensor such as a wheel speed sensor as described in, for example, PTL 1.

CITATION LIST

Patent Literature

PTL 1: JP 2012-47553 A

SUMMARY OF INVENTION

Technical Problem

However, for the vertical motion state amount estimation method described in PTL 1, vertical force in which the frictional force acting in the front-rear direction or lateral direction of the wheel acts on the vehicle body due to the geometry of suspension is not taken into consideration. Hence, there is a possibility of failing to estimate the vertical motion state amount with high accuracy in a situation where the frictional force acting in the front-rear direction or lateral direction of the wheel increases during acceleration/deceleration or turning.

The present invention is an invention for solving the above problem and an object thereof is to provide a vehicle motion state estimation device and a vehicle motion state estimation method that can estimate the vertical motion state amount with high accuracy by taking into consideration vertical force in which the frictional force acting in the front-rear direction or lateral direction of the wheel acts on the vehicle body due to the geometry of suspension, and a vehicle.

Solution to Problem

In the light of the above, the present invention is "a vehicle motion state estimation device in a vehicle in which a wheel and a vehicle body are coupled via a suspension, the vehicle motion state estimation device including: a vertical motion-caused wheel speed component estimation unit that estimates a wheel speed component caused by vertical motion of the vehicle; a vertical force estimation unit that calculates vertical force in which frictional force of the wheel caused by motion of the vehicle acts on the vehicle body by geometry of the suspension, and a vertical motion estimation unit that estimates a state amount of vertical motion of a vehicle, in which the vertical motion estimation unit estimates a state amount of vertical motion of the vehicle based on a wheel speed component from the vertical motion-caused wheel speed component estimation unit and vertical force acting on the vehicle body from the vertical force estimation unit".

The present invention is "a vehicle including a vehicle motion state estimation device, in which a suspension control device to which a state amount estimated by a vehicle motion state estimation device is input controls force generated in a suspension based on the estimated state amount".

The present invention is "a vehicle motion state estimation method in a vehicle in which a wheel and a vehicle body are coupled via a suspension, the vehicle motion state estimation method, including: estimating a state amount of vertical motion of a vehicle based on a wheel speed component caused by vertical motion of the vehicle, and vertical force in which frictional force of the wheel caused by motion of the vehicle acts on the vehicle body by geometry of the suspension".

Advantageous Effects of Invention

According to the present invention, a vehicle motion state can be estimated with high accuracy regardless of traveling conditions such as constant speed, acceleration/deceleration, straight traveling, and turning.

DESCRIPTION OF EMBODIMENTS

Embodiments of the present invention will be described below in detail with reference to the drawings.

First Embodiment

The vehicle motion state estimation device 50, a vehicle motion state estimation method, and a vehicle according to the first embodiment will be described with reference to FIGS. 1 to 13.

Figure 1:
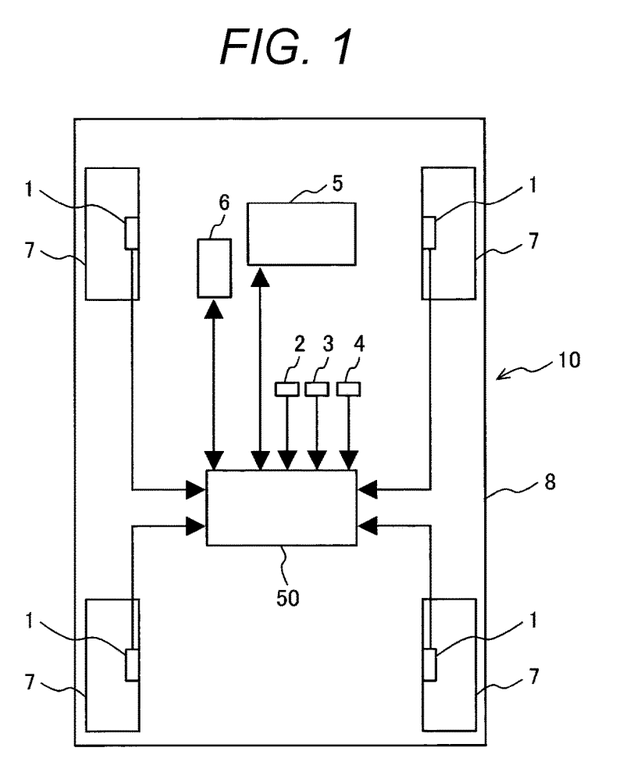
FIG. 1 is a view illustrating a configuration example of a vehicle on which a vehicle motion state estimation device 50 according to a first embodiment is mounted.

FIG. 1 illustrates a configuration example view of a vehicle 10 on which the vehicle motion state estimation device 50 is mounted.

The vehicle motion state estimation device 50 is mounted on the vehicle 10 and is connected to a wheel speed sensor 1, an acceleration sensor 2, a gyro sensor 3, a steering angle sensor 4, a brake/drive control unit 5, and a steering control unit 6.

The sensors (wheel speed sensor 1, acceleration sensor 2, gyro sensor 3, steering angle sensor 4) mounted on the vehicle 10 are not so-called dedicated sensors but generally mounted sensors.

The wheel speed sensor 1 detects rotation speed of wheels 7 at four positions of front, rear, left, and right of a vehicle body 8. The acceleration sensor 2 detects acceleration acting on the center of gravity of the vehicle body 8. The gyro sensor 3 detects a yaw rate, which is the rotational angular speed about the center of gravity of the vehicle body 8. The steering angle sensor 4 detects a rotation angle of a steering wheel or a steering angle of the wheels 7 caused by steering by a driver driving the vehicle 10.

Here, the wheel speed sensor 1 is configured to detect a relative rotation speed between a rotation portion installed in, for example, an axle hub or a brake drum and a fixed portion installed in a knuckle or a brake carrier, and the detected rotation speed is caused by either brake/drive force or vertical motion of the vehicle.

The vertical motion of the vehicle is caused by the vertical displacement of the road surface, the steering of the driver, or the acceleration/deceleration operation, and the value calculated by multiplying the rotation speed caused by the vertical motion of the vehicle by the tire radius is referred to as a vertical motion-caused wheel speed component.

The brake/drive control unit 5 is a unit that controls the brake/drive force generated by the internal combustion engine, the electric motor, the brake caliper, or the like based on the operation of the driver, the output of the vehicle motion state estimation device 50, or the like.

The steering control unit 6 is a unit that controls the steering angle of the wheel 7 based on the operation of the driver, the output of the vehicle motion state estimation device 50, or the like.

Here, the brake/drive control unit 5 and/or the steering control unit 6 may include a plane motion estimation unit that estimates and outputs a state amount caused by a plane motion such as a slip rate that is a wheel slip in the front-rear direction of the wheel 7, a lateral slip angle that is a wheel slip in the lateral direction, and a speed in the front-rear direction of the vehicle using a value detected by the above-described sensors (wheel speed sensor 1, acceleration sensor 2, gyro sensor 3, steering angle sensor 4) as input.

The vehicle 10 may include a high-order controller that transmits a control command and an estimated value to the brake/drive control unit 5 and the steering control unit 6, and the high-order controller may be configured to generate a control command and an estimated value based on the output of the vehicle motion state estimation device 50.

Hereinafter, the value detected by the above-described sensors (wheel speed sensor 1, acceleration sensor 2, gyro sensor 3, steering angle sensor 4) and the value estimated and output by the brake/drive control unit 5 and/or the steering control unit 6 will be referred to as travel state information.

Next, a conceptual configuration example of the vehicle motion state estimation device 50 will be described with reference to FIG. 2.

The vehicle motion state estimation device 50 of FIG. 2 estimates a vertical motion state amount x described later with the above-mentioned travel state information as input and outputs the result to the brake/drive control unit 5 or the like, and the vehicle motion state estimation device 50 includes a vertical motion-caused wheel speed component estimation unit 51 that estimates a vertical motion-caused wheel speed component y, a vertical force estimation unit 52 that estimates a vertical force u, and a vertical motion estimation unit 53 that estimates the vertical motion state amount x.

Figure 2:
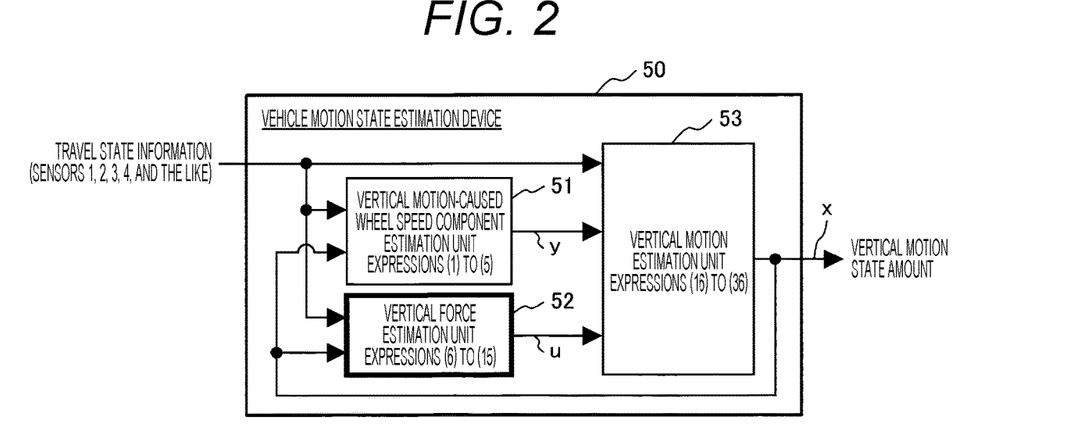
FIG. 2 is a view illustrating a conceptual configuration example of the vehicle motion state estimation device 50 according to the first embodiment.

The vehicle motion state estimation device 50 and method of FIG. 2 according to the first embodiment of the present invention are characterized, in short, by including the vertical force estimation unit 52 that estimates vertical force from the point of view of the frictional force. The vertical motion estimation unit 53 estimates the vertical motion based on the output from the vertical force estimation unit 52.

The vertical motion-caused wheel speed component estimation unit 51 estimates and outputs the vertical motion-caused wheel speed component y using the travel state information as input.

Using the travel state information as input, the vertical force estimation unit 52 estimates and outputs a vertical force (plane motion-caused vertical force u (Fzab)) in which the frictional force acting in the front-rear direction and/or the lateral direction of the wheels caused by the vehicle motion acts on the vehicle body by geometry of the suspension.

The vertical motion estimation unit 53 estimates and outputs the vertical motion state amount x using, as input, the travel state information, the vertical motion-caused wheel speed component y, the plane motion-caused vertical force u (Fzab), and a ground load fluctuation-caused wheel speed u (Vwzc) described later.

Here, the vertical motion-caused wheel speed component estimation unit 51 and the vertical force estimation unit 52 may be configured to input the vertical motion state amount x.

In short, the vehicle motion state estimation device illustrated in FIG. 2 can be said as "a vehicle motion state estimation device in a vehicle in which a wheel and a vehicle body are coupled via a suspension, the vehicle motion state estimation device including: a vertical motion-caused wheel speed component estimation unit that estimates a wheel speed component caused by vertical motion of the vehicle; a vertical force estimation unit that calculates vertical force in which frictional force of the wheel caused by motion of the vehicle acts on the vehicle body by geometry of the suspension, and a vertical motion estimation unit that estimates a state amount of vertical motion of a vehicle, in which the vertical motion estimation unit estimates a state amount of vertical motion of the vehicle based on a wheel speed component from the vertical motion-caused wheel speed component estimation unit and vertical force acting on the vehicle body from the vertical force estimation unit".

Next, a specific example of the estimation method of the vertical motion-caused wheel speed component y in the vertical motion-caused wheel speed component estimation unit 51 will be described with reference to FIG. 3. The estimation method of the vertical motion-caused wheel speed component y in the vertical motion-caused wheel speed component estimation unit 51 uses Expressions (1) to (5) described later. Note that some of these expressions include alternative expressions.

Figure 3:
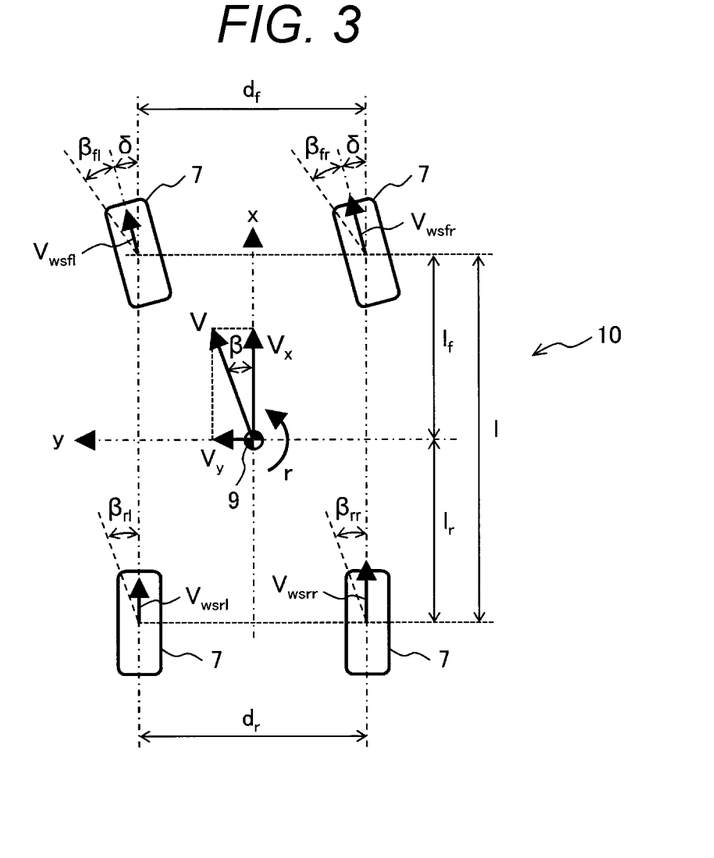
FIG. 3 is a view illustrating a four-wheeled vehicle plane model according to the first embodiment.

FIG. 3 is a view illustrating a four-wheeled vehicle plane model in which a front wheel steering four-wheeled vehicle during left turn is viewed from above.

The four-wheeled vehicle plane model uses a coordinate system with a sprung center of gravity 9 fixed to the vehicle 10 as the origin, and the front-rear direction of the vehicle is an x-axis, the right-left direction of the vehicle is a y-axis, and the vertical direction of the vehicle is a z-axis.

Here, an actual steering angle, which is the steering angle of the wheel 7, is δ. The speed in the travel direction of the vehicle is V. The speed in the front-rear direction of the vehicle is Vx. The speed in the right-left direction of the vehicle is Vy. The yaw rate, which is the rotational angular speed about the z-axis detected by the gyro sensor 3, is r. The angle formed by the travel direction and the front-rear direction of the vehicle is a vehicle body lateral slip angle β. The angle formed by the travel direction and the rotation surface of the wheels 7 is wheel lateral slip angles βfl, βfr, βrl, and βrr. The wheel speed Vws is Vwsfl, Vwsfr, Vwsrl, and Vwsrr. The wheelbase, which is the distance between the front wheel axle and rear wheel axle, is l. The distance in the vehicle front-rear direction from the front and rear wheel axles to the sprung center of gravity is lf and lr. The tread of the front and rear wheels is df and dr.

In the above symbol display, the index f represents the front wheels, r represents the rear wheels, fl represents the left front wheel, fr represents the right rear wheel, rl represents the left rear wheel, and rr represents the right rear wheel.

The wheel speeds Vwsfl, Vwsfr, Vwsrl, and Vwsrr are movement speeds of the wheels calculated by multiplying the rotation speed of the wheel 7 by the tire radius, and are values that can be detected by the wheel speed sensor 1.

The wheel speed Vws (Vwsfl, Vwsfr, Vwsrl, and Vwsrr) includes a vertical motion-caused wheel speed component caused by vertical motion of the vehicle and a plane motion-caused wheel speed component caused by plane motion of the vehicle accompanying the steering and acceleration/deceleration operation of the driver.

Therefore, the vertical motion-caused wheel speed component estimated by the vertical motion-caused wheel speed component estimation unit 51 is obtained by subtracting the plane motion-caused wheel speed component from the wheel speed Vws (Vwsfl, Vwsfr, Vwsrl, and Vwsrr), and is expressed by Expression (1).

[Expression 1]

$$\begin{cases} V_{wzfl} = V_{wfl} - V_x \\ V_{wzfr} = V_{wfr} - V_x \\ V_{wzrl} = V_{wrl} - V_x \\ V_{wzrr} = V_{wrr} - V_x \end{cases} \quad (1)$$

Here, Vwzfl, Vwzfr, Vwzrl, and Vwzrr in Expression (1) are wheel speeds obtained by converting the vertical motion-caused wheel speed components into speeds in the front-rear direction of the vehicle at the position of the sprung center of gravity 9, and Vwfl, Vwfr, Vwrl, and Vwrr are wheel speeds obtained by converting the wheel speeds Vwsfl, Vwsfr, Vwsrl, and Vwsrr into speeds in the front-rear direction of the vehicle at the position of the sprung center of gravity 9.

The wheel speeds Vwfl, Vwfr, Vwrl, and Vwrr converted into the speeds in the front-rear direction of the vehicle at the position of the sprung center of gravity 9 in Expression (1) are obtained by adding/subtracting the speed difference of each wheel based on the actual steering angle δ and the yaw rate r caused by turning motion to/from the wheel speed, and are expressed by Expression (2).

[Expression 2]

$$\begin{cases} V_{wfl} = V_{wsfl} \cos \delta + \frac{1}{2} d_f r \\ V_{wfr} = V_{wsfr} \cos \delta - \frac{1}{2} d_f r \\ V_{wrl} = V_{wsrl} + \frac{1}{2} d_r r \\ V_{wrr} = V_{wsrr} - \frac{1}{2} d_r r \end{cases} \quad (2)$$

The speed Vx in the front-rear direction of the vehicle in Expression (1) is obtained by integrating an acceleration Gx in the front-rear direction of the vehicle, and is expressed by Expression (3).

[Expression 3]

$$V_x = \int G_x dt \quad (3)$$

Here, as the acceleration Gx in the front-rear direction of the vehicle of Expression (3), a front-rear acceleration Gxse acting on the center of gravity of the vehicle body 8 detected by the acceleration sensor 2 may be used. However, the acceleration Gx may be obtained by using Expression (4) because it is obtained with high accuracy by removing the gravity acceleration component accompanying the vehicle body pitching included in the front-rear acceleration Gxse.

[Expression 4]

$$G_x = \frac{G_{xse} + g \sin \theta_y}{\cos \theta_y} \quad (4)$$

Furthermore, the acceleration Gx in the front-rear direction of the vehicle of Expression (4) is obtained with higher accuracy by removing the lateral acceleration component accompanying the vehicle body lateral slip included in the front-rear acceleration Gxse, and hence the acceleration Gx may be obtained by using Expression (5).

[Expression 5]

$$G_x = \frac{G_{xse} + g \sin \theta_y}{\cos \theta_y} + \frac{G_{yse} - g \sin \theta_x}{\cos \theta_x} \sin \beta \quad (5)$$

In Expressions (4) and (5), Gyse is the lateral acceleration acting on the center of gravity of the vehicle body 8, g is the gravitational acceleration, θx and θy are the roll angle and pitch angle. For example, a value detected by the acceleration sensor 2 is used as the lateral acceleration Gyse, and values estimated by the vertical motion estimation unit 53 are used as the roll angle θx and pitch angle θy.

Note that the speed Vx in the front-rear direction of the vehicle of Expression (1) may be a plane motion state amount estimated by the controller such as the brake control unit 6 described above or a value calculated by time-differentiating the position information detected using a GPS, and the acquisition method of the speed Vx in the front-rear direction of the vehicle is not limited.

The roll angle θx and the pitch angle θy in Expressions (4) and (5) may be values estimated by the controller such as the brake control unit 6 described above or values detected by using a camera or the like, and the acquisition method of the roll angle θx and the pitch angle θy is not limited.

The vehicle body lateral slip angle β of Expression (5) may be a plane motion state amount estimated by the above-described brake control unit 6 or the like a value detected by using a GPS, or a plane motion state amount estimated by a plane motion estimation unit not illustrated and provided in the vehicle motion state estimation device 50, and the acquisition method of the vehicle body lateral slip angle β is not limited.

From the above, the vertical motion-caused wheel speed component estimation unit 51 estimates and outputs the vertical motion-caused wheel speed components Vwzfl, Vwzfr, Vwzrl, and Vwzrr using, as input, the wheel speeds Vwsfl, Vwsfr, Vwsrl, and Vwsrr detected by the wheel speed sensor 1, which is the travel state information, and the yaw rate r, which is the rotational angular speed about the z-axis, detected by the gyro sensor 3. Note that in the present description, FIG. 2, or the like, the estimated vertical motion-caused wheel speed components Vwzfl, Vwzfr, Vwzrl, and Vwzrr are sometimes collectively referred to as the vertical motion-caused wheel speed component y.

In short, the vertical motion-caused wheel speed component estimation unit 51 of FIG. 2 estimates the wheel speed component caused by vertical motion of the vehicle.

Next, a specific example of the estimation method of the plane motion-caused vertical force u in the vertical force estimation unit 52 will be described with reference to FIGS. 4 to 7. The estimation method of the plane motion-caused vertical force u in the vertical force estimation unit 52 uses Expressions (6) to (15) described later. Note that some of these expressions include alternative expressions.

Figure 4:
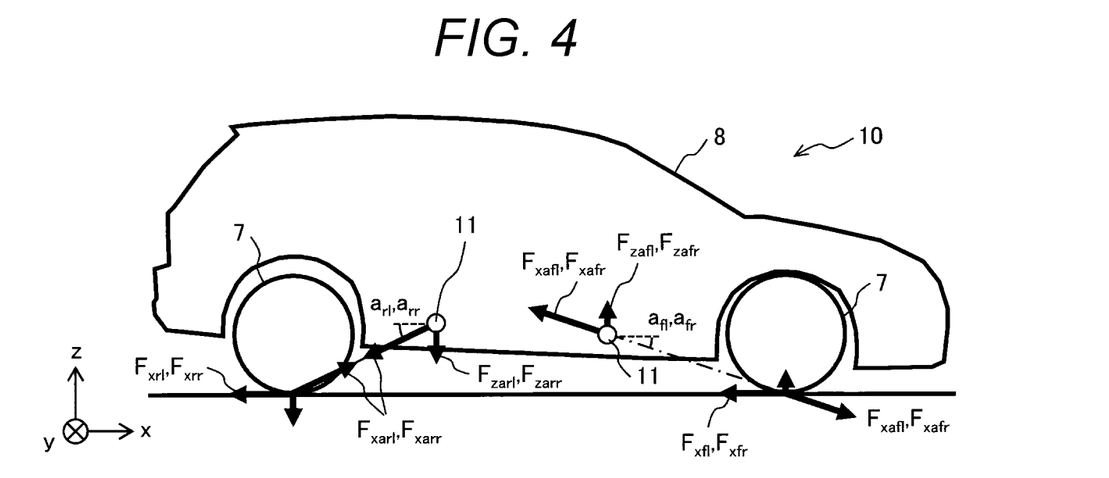
FIG. 4 is a view illustrating anti-dive force and anti-lift force generated during deceleration according to the first embodiment.

First, the plane motion-caused vertical force caused by the tire front-rear force will be described.

FIG. 4 is a view of the vehicle 10 during deceleration viewed from the right side, and schematically expresses a situation of the tire front-rear force caused during deceleration acting as a vertical force of the vehicle body by geometry of the suspension.

Tire front-rear forces Fxfl, Fxfr, Fxrl, and Fxrr caused in the horizontal axis direction of the wheel 7 act as forces Fxafl, Fxafr, Fxarl, and Fxarr pulling the vehicle body 8 on the line connecting the acting point of the tire front-rear force on the ground surface of the wheel 7 and an instantaneous rotation center 11 of the suspension of the vehicle 10 by the acting point and the instantaneous rotation center 11.

Vertical forces Fzafl, Fzafr, Fzarl, and Fzarr in the vertical axis direction of the pulling force are the vertical force acting on the vehicle body 8, i.e., the plane motion-caused vertical force caused by the tire front-rear force.

Therefore, the plane motion-caused vertical force caused by the tire front-rear force estimated by the vertical force estimation unit 52 is obtained by multiplying the tire front-rear forces Fxfl, Fxfr, Fxrl, and Fxrr caused in the horizontal axis direction of the wheel 7 by the tangent of the angle formed by the line connecting the horizontal axis, the instantaneous rotation center 11 of the suspension, and the acting point of the tire front-rear force on the ground surface of the wheel 7 to the tire front-rear force, and the plane motion-caused vertical force is expressed by Expression (6).

[Expression 6]

$$\begin{cases} F_{zafl} = F_{xfl} \tan a_{fl} \\ F_{zafr} = F_{xfr} \tan a_{fr} \\ F_{zarl} = F_{xrl} \tan a_{rl} \\ F_{zarr} = F_{xrr} \tan a_{rr} \end{cases} \quad (6)$$

Here, afl, afr, arl, and arr in Expression (6) are angles formed by the line connecting the horizontal axis, the instantaneous rotation center 11 of the suspension, and the acting point of the tire front-rear force on the ground surface of the wheel 7.

The upward forces Fzafl and Fzafr generated on the front wheel side during deceleration illustrated in FIG. 4 are referred to as anti-dive forces, and downward forces Fzarl and Fzarr generated on the rear wheel side are referred to as anti-lift forces.

Although not illustrated, a force in a direction vertically opposite to the anti-dive force or the anti-lift force is generated by reversing front and rear the orientation of the tire front-rear force during acceleration, and the force is referred to as anti-squat force.

The tire front-rear forces Fxfl, Fxfr, Fxrl, and Fxrr in Expression (6) are obtained by dividing the force acting in the front-rear direction of the vehicle, which is the product of the mass of the vehicle and the acceleration in the front-rear direction of the vehicle, into the front and rear wheels based on the ratio of the drive force or brake force acting on the rear wheels with respect to the front wheels, and the tire front-rear forces are expressed by Expression (7).

[Expression 7]

$$\begin{cases} F_{xfl} = F_{xfr} = \dfrac{(m_2 + m_{1fl} + m_{1fr} + m_{1rl} + m_{1rr})G_x}{2}(1-\varepsilon) \\ F_{xrl} = F_{xrr} = \dfrac{(m_2 + m_{1fl} + m_{1fr} + m_{1rl} + m_{1rr})G_x}{2}\varepsilon \end{cases} \quad (7)$$

Here, ε in Expression (7) is the ratio of the drive force or brake force acting on the front and rear wheels, m2 is the sprung mass, and m1fl, m1fr, m1rl, and m1rr are unsprung masses.

Figure 6:
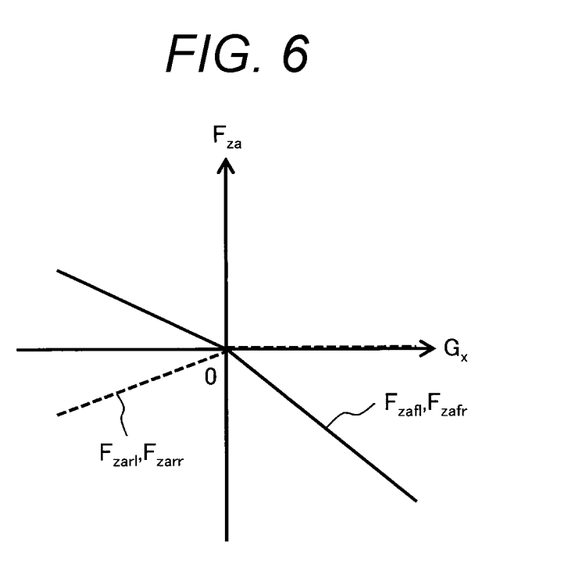
FIG. 6 is a view illustrating a relationship between front-rear acceleration and anti-dive force, anti-lift force, and anti-squat force according to the first embodiment.

FIG. 6 is a view illustrating a relationship between the front-rear acceleration and the anti-dive, anti-lift, and anti-squat forces in the case of a front-wheel-drive vehicle. FIG. 6 illustrates the relationship between the front-rear acceleration Gx in Expression (7) and the anti-dive forces Fzafl and Fzafr and the anti-lift forces Fzarl and Fzarr in Expression (6).

Figure 5:
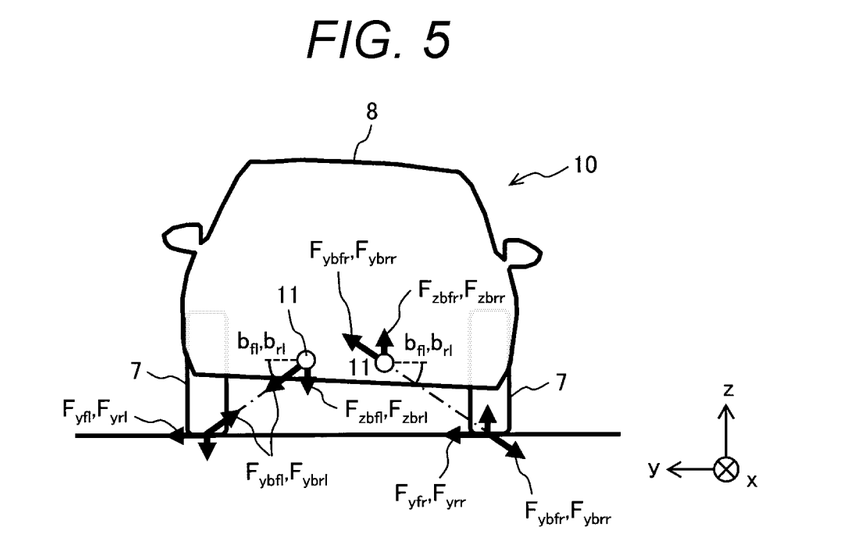
FIG. 5 is a view illustrating jack-up force and jack-down force generated during left turning according to the first embodiment.

Next, the plane motion-caused vertical force caused by the tire lateral force will be described.

FIG. 5 is a view of the vehicle 10 during left turn viewed from the rear, and schematically expresses a situation of the tire lateral force caused during left turn acting as a vertical force of the vehicle body by geometry of the suspension.

Tire lateral forces Fyfl, Fyfr, Fyrl, and Fyrr caused in the horizontal axis direction of the wheel 7 act as forces Fybfl, Fybfr, Fybrl, and Fybrr pulling the vehicle body 8 on the line connecting the acting point of the tire lateral force on the ground surface of the wheel 7 and the instantaneous rotation center 11 of the suspension of the vehicle 10 by the acting point and the instantaneous rotation center 11.

Vertical forces Fzbfl, Fzbfr, Fzbrl, and Fzbrr in the vertical axis direction of the pulling force are the vertical force acting on the vehicle body 8, i.e., the plane motion-caused vertical force caused by the tire lateral force.

Therefore, the plane motion-caused vertical force caused by the tire lateral force estimated by the vertical force estimation unit 52 is obtained by multiplying the tire lateral forces Fyfl, Fyfr, Fyrl, and Fyrr caused in the horizontal axis direction of the wheel 7 by the tangent of the angle formed by the line connecting the horizontal axis, the instantaneous rotation center 11 of the suspension, and the acting point of the tire lateral force on the ground surface of the wheel 7 to the tire lateral force, and the plane motion-caused vertical force is expressed by Expression (8).

[Expression 8]

$$\begin{cases} F_{zbfl} = F_{yfl} \tan b_{fl} \\ F_{zbfr} = F_{yfr} \tan b_{fr} \\ F_{zbrl} = F_{yrl} \tan b_{rl} \\ F_{zbrr} = F_{yrr} \tan b_{rr} \end{cases} \quad (8)$$

Here, bfl, bfr, brl, and brr in Expression (8) are angles formed by the line connecting the horizontal axis, the instantaneous rotation center 11 of the suspension, and the acting point of the tire lateral force on the ground surface of the wheel 7.

The downward forces Fzbfl and Fzbrl generated on the left wheel side during left turn illustrated in FIG. 5 are referred to as jack-down forces, and upward forces Fzbfr and Fzbrr generated on the right wheel side are referred to as jack-up forces.

Note that in Expressions (6) and (8), the term of tangent is, in short, a constant, and this constant is a proportional coefficient based on an angle formed by a line connecting the horizontal axis, the instantaneous rotation center of the suspension, and the acting point of the frictional force on the ground surface of the wheel.

The tire lateral forces Fyfl, Fyfr, Fyrl, and Fyrr of Expression (8) are obtained by dividing the force acting in the lateral direction of the vehicle, which is the product of the mass of the vehicle and the acceleration in the lateral direction of the vehicle, into front and rear wheels based on the distance in the vehicle front-rear direction from the front and rear wheel axles to the sprung center of gravity and the ratio of the wheel base, and then by adding/subtracting the yaw moment, and the tire lateral forces are expressed by Expression (9).

[Expression 9]

$$\begin{cases} F_{yfl} = F_{yfr} = \dfrac{(m_2 + m_{1fl} + m_{1fr} + m_{1rl} + m_{1rr})G_y l_r + I_z \dot{r}}{2l} \\ F_{yrl} = F_{yrr} = \dfrac{(m_2 + m_{1fl} + m_{1fr} + m_{1rl} + m_{1rr})G_y l_f - I_z \dot{r}}{2l} \end{cases} \quad (9)$$

Here, Gy in Expression (9) is the acceleration in the lateral direction of the vehicle, and Iz is a yaw moment of inertia of the vehicle 10.

Figure 7:
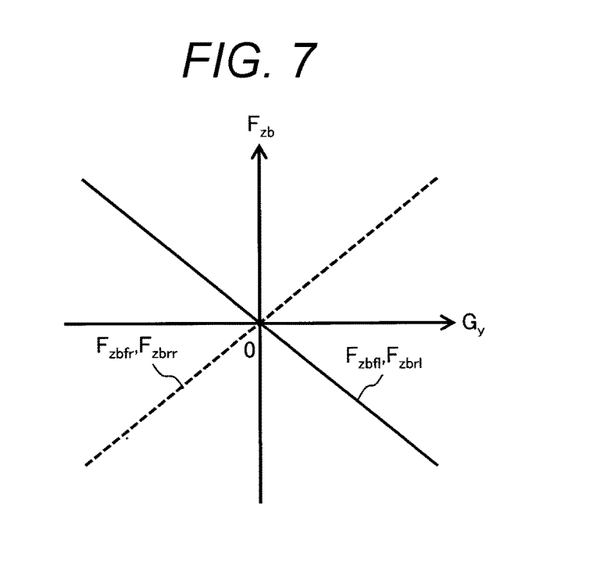
FIG. 7 is a view illustrating a relationship between lateral acceleration and jack-up force and jack-down force according to the first embodiment.

FIG. 7 is a view illustrating a relationship between the lateral acceleration and the jack-up force and jack-down force in the case where the constant gains βf and βr are the same. FIG. 7 illustrates the relationship between the lateral acceleration Gy in Expression (9) and the jack-up forces Fzbfr and Fzbrr and the jack-down forces Fzbfl and Fzbrl in Expression (8).

The tire front-rear forces Fxfl, Fxfr, Fxrl, and Fxrr in Expression (6) and the tire lateral forces Fyfl, Fyfr, Fyrl, and Fyrr in Expression (8) can be acquired by various methods such as use of a value estimated by the controller such as the brake control unit 6 described above, a value estimated by the plane motion estimation unit not illustrated and provided in the vehicle motion state estimation device 50, and a six-component force meter that detects forces in the x-axis, y-axis, and z-axis directions caused in the tire and moment around each axis.

The angles afl, afr, arl, arr, bfl, bfr, brl, and brr formed by the lines connecting the horizontal axes of Expressions (6) and (8), the instantaneous rotation center of the suspension, and the acting point of the tire force on the ground surface of the wheel 7 can be acquired by using, as an approximate value, a value obtained geometrically based on the vertical motion state amount estimated by the vertical motion estimation unit 53 described above or a value in a state where the vehicle is at rest.

In order to realize the relationship between Expressions (6) and (7), the vertical force estimation unit 52 may estimate the vertical force caused in the vehicle body by using a characteristic diagram that outputs the vertical force caused in the vehicle body using the front-rear acceleration and/or lateral acceleration of the vehicle as input. Similarly, in order to realize the relationship between Expressions (8) and (9), the vertical force estimation unit 52 may estimate the vertical force caused in the vehicle body by using a characteristic diagram that outputs the vertical force caused in the vehicle body using the frictional force acting in the front-rear direction and/or lateral direction of the wheels as input. Furthermore, these characteristic diagrams may be made of a linear or nonlinear map based on an angle formed by a line connecting the horizontal axis, the instantaneous rotation center of the suspension, and the acting point of the frictional force on the ground surface of the wheel.

Thus, the vertical force can be estimated using Expressions (6) and (8). In short, these Expressions (6) to (8) estimate the vertical force caused in the vehicle body by multiplying the front-rear acceleration and/or lateral acceleration of the vehicle by a constant, or estimate the vertical force caused in the vehicle body by multiplying the frictional force acting in the front-rear direction and/or lateral direction of the wheels by a constant. Here, the constant is a proportional coefficient based on an angle formed by a line connecting the horizontal axis, the instantaneous rotation center of the suspension, and the acting point of the frictional force on the ground surface of the wheel.

On the other hand, the plane motion-caused vertical forces Fzafl, Fzafr, Fzarl, and Fzarr caused by the tire front-rear force may be calculated by using Expression (10), and the plane motion-caused vertical forces Fzbfl, Fzbfr, Fzbrl, and Fzbrr caused by the tire lateral force may be calculated by using Expression (11).

[Expression 10]

$$\begin{cases} F_{zafl} = F_{zafr} = A_f G_x \\ F_{zarl} = F_{zarr} = A_r G_x \end{cases} \quad (10)$$

[Expression 11]

$$\begin{cases} -F_{zbfl} = F_{zbfr} = B_f G_y \\ -F_{zbrl} = F_{zbrr} = B_r G_y \end{cases} \quad (11)$$

Here, Af and Ar in Expression (10) are the proportional coefficients on an assumption that the plane motion-caused vertical forces Fzafl, Fzafr, Fzarl, and Fzarr caused by the tire front-rear force are proportional to the acceleration Gx in the front-rear direction of the vehicle, and Bf and Br in Expression (11) are the proportional coefficients on an assumption that the plane motion-caused vertical forces Fzbfl, Fzbfr, Fzbrl, and Fzbrr caused by the tire lateral force are proportional to the acceleration Gy in the lateral direction of the vehicle.

The proportional coefficients Af, Ar, Bf, and Br may be values calculated from a balance between a pitch moment and a roll moment when a constant acceleration in the front-rear direction of the vehicle or acceleration in the lateral direction of the vehicle acts, or values calculated based on the vertical motion state amount estimated by the vertical motion estimation unit 53, and the calculation method of the proportional coefficients Af, Ar, Bf, and Br is not limited.

Here, as Gx in the front-rear direction of the vehicle of Expressions (7) and (10), a value detected by the acceleration sensor 2 may be used as it is, or the above-mentioned Expressions (4) and (5) may be used. The acquisition method of the acceleration Gx in the front-rear direction of the vehicle is not limited.

As the acceleration Gy in the lateral direction of the vehicle of Expressions (9) and (11), a value detected by the acceleration sensor 2 may be used as it is. However, the acceleration Gy may be obtained by using Expression (12) because it is obtained with high accuracy by removing the gravity acceleration component accompanying the vehicle body rolling included in the lateral acceleration Gyse.

[Expression 12]

$$G_y = \frac{G_{yse} - g\sin\theta_x}{\cos\theta_x} \quad (12)$$

Furthermore, the acceleration Gy in the lateral direction of the vehicle of Expressions (9) and (11) is obtained with higher accuracy by removing the front-rear acceleration component accompanying the vehicle body lateral slip included in the lateral acceleration Gyse, and hence the acceleration Gy may be obtained by using Expression (13).

[Expression 13]

$$G_y = \frac{G_{yse} - g\sin\theta_x}{\cos\theta_x} - \frac{G_{xse} + g\sin\theta_y}{\cos\theta_y}\sin\beta \quad (13)$$

According to Expressions (4), (5), (12), and (13), the acceleration Gx in the front-rear direction of the vehicle and the acceleration Gy in the lateral direction of the vehicle have been corrected based on the roll angle θx and the pitch angle θy, which are outputs of the vertical motion estimation unit 53.

Since the lateral acceleration Gy caused when the vehicle is turning is obtained by the product of the tangential speed and the angular speed of the turning circle as shown in Expression (14), it is also possible to estimate the lateral acceleration Gy without using an acceleration sensor that detects the lateral acceleration Gy. According to Expression (14), the lateral acceleration Gy can be estimated from the speed Vx in the front-rear direction of the vehicle and the yaw rate r.

[Expression 14]

$$G_y = V_x r \quad (14)$$

From the above, the vertical force can be easily estimated using Expressions (10) and (11).

Thus, the plane motion-caused vertical forces Fzafl, Fzafr, Fzarl, and Fzarr caused by the tire front-rear force and the plane motion-caused vertical forces Fzbfl, Fzbfr, Fzbrl, and Fzbrr caused by the tire lateral force can be estimated from the travel state information. Hence, it is possible to calculate the sum of these forces, i.e., the plane motion-caused vertical forces Fzabfl, Fzabfr, Fzabrl, and Fzabrr, which are expressed by Expression (15).

[Expression 15]

$$\begin{cases} F_{zabfl} = F_{zafl} + F_{zbfl} \\ F_{zabfr} = F_{zafr} + F_{zbfr} \\ F_{zabrl} = F_{zarl} + F_{zbrl} \\ F_{zabrr} = F_{zarr} + F_{zbrr} \end{cases} \quad (15)$$

Note that in the present description, FIG. 2, or the like, the estimated plane motion-caused vertical forces Fzabfl, Fzabfr, Fzabrl, and Fzabrr are sometimes collectively referred to as the plane motion-caused vertical force u (Fzab).

In short, the vertical force estimation unit 52 of FIG. 2 calculates the vertical force in which the frictional force of the wheels caused by motion of the vehicle acts on the vehicle body by geometry of the suspension. The frictional force acts in the front-rear direction and/or lateral direction of the wheels.

Next, a specific example of the estimation method of the vertical motion state amount x in the vertical motion estimation unit 53 will be described with reference to FIGS. 8 to 12. The estimation method of the vertical motion state amount x in the vertical motion estimation unit 53 uses Expressions (16) to (36) described later. Note that some of these expressions include alternative expressions.

In general, when the measurement output is y and the control input is u, the observer estimates the state variable x from the measurement output y and the control input u.

The vertical motion estimation unit 53 of the present embodiment can be called an observer that estimates the vertical motion state amount x using, as input, the vertical motion-caused wheel speed component y, the plane motion-caused vertical force u (Fzab), and the ground load fluctuation-caused wheel speed u (Vwzc) described later. A motion equation and an observation equation necessary for a state equation when, for example, the vertical motion estimation unit 53 is configured as a linear observer including a time-invariant constant will be described.

First, the motion equation used for estimation of the vertical motion state amount x in the vertical motion estimation unit 53 will be described with reference to FIG. 8. The motion equation used for estimation of the vertical motion state amount x in the vertical motion estimation unit 53 uses Expressions (16) to (21) described later.

Figure 8:
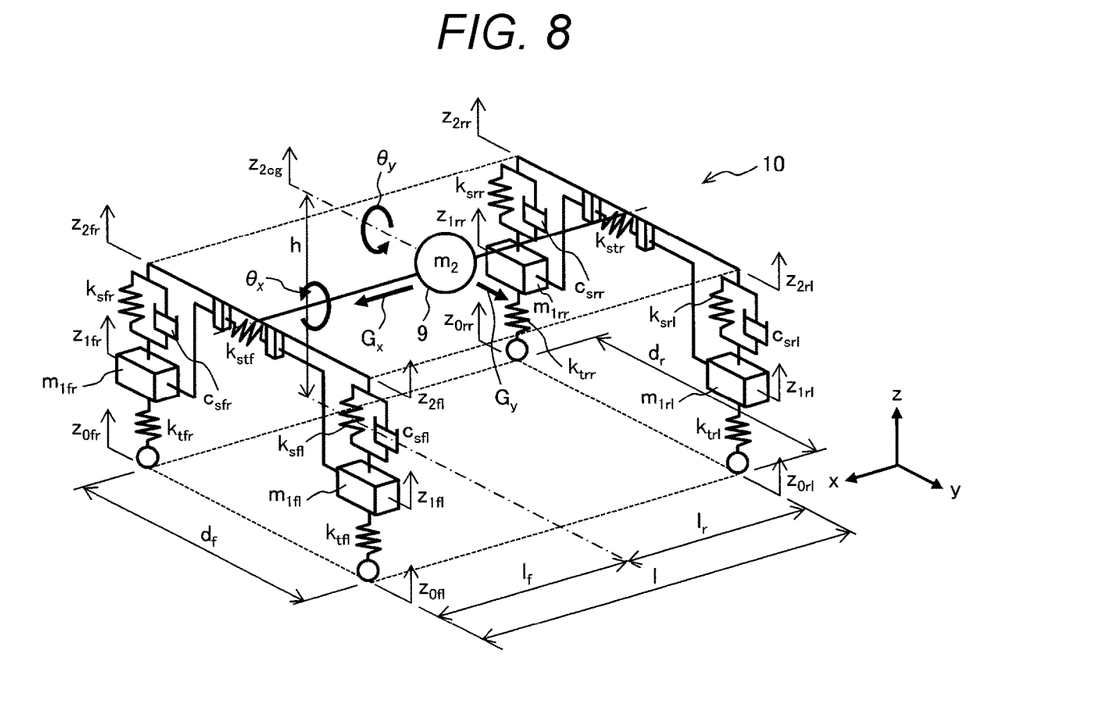
FIG. 8 is a view illustrating a four-wheel full vehicle model according to the first embodiment.

FIG. 8 is a view of the vehicle 10 with road surface vertical displacement as viewed obliquely from the left, and illustrates a four-wheel full vehicle model in which the vehicle body 8, the wheels 7, and the like are represented by mass points and each mass point is connected by a spring or a shock absorber. Note that the symbol notation and the like in FIG. 8 are given in accordance with the example of the four-wheeled vehicle plane model in FIG. 3.

Furthermore, in the four-wheel full vehicle of FIG. 8, the vertical displacement of the sprung center of gravity 9 is denoted as z2cg, the sprung vertical displacement on each wheel is denoted as z2fl, z2fr, z2rl, and z2rr, the unsprung vertical displacement is denoted as z1fl, z1fr, z1rl, and z1rr, the road surface vertical displacement is denoted as z0fl, z0fr, z0rl, and z0rr, the roll angle and pitch angle of the sprung center of gravity 9 are denoted as θx and θy, respectively, the suspension spring constant is denoted as ksfl, ksfr, ksrl, and ksrr, the suspension damping coefficient is denoted as csfl, csfr, csrl, and csrr, the stabilizer spring constant is denoted as kstf and kstr, and the height of the sprung center of gravity 9 is denoted as h.

On the basis of this figure, the relationships of Expressions (16) to (21) are shown.

[Expression 16]

$$m_2 \ddot{z}_{2cg} = -F_{sfl} - F_{sfr} - F_{srl} - F_{srr} + F_{zabfl} + F_{zabfr} + F_{zabrl} + F_{zabrr} \quad (16)$$

[Expression 17]

$$\begin{cases} m_{1fl} \ddot{z}_{1fl} = F_{sfl} - k_{tfl}(z_{1fl} - z_{0fl}) + F_{zabfl} \\ m_{1fr} \ddot{z}_{1fr} = F_{sfr} - k_{tfr}(z_{1fr} - z_{0fr}) + F_{zabfr} \\ m_{1rl} \ddot{z}_{1rl} = F_{srl} - k_{trl}(z_{1rl} - z_{0rl}) + F_{zabrl} \\ m_{1rr} \ddot{z}_{1rr} = F_{srr} - k_{trr}(z_{1rr} - z_{0rr}) + F_{zabrr} \end{cases} \quad (17)$$

[Expression 18]

$$I_x \ddot{\theta}_x = \frac{d_f}{2}(-F_{sfl} + F_{zabfl} + F_{sfr} - F_{zabfr}) + \\ \frac{d_r}{2}(-F_{srl} + F_{zabrl} + F_{srr} - F_{zabrr}) + m_2 g \theta_x h_{xc} + m_2 G_y h_{xc} \quad (18)$$

[Expression 19]

$$I_y \ddot{\theta}_y = l_f(F_{sfl} - F_{zabfl} + F_{sfr} - F_{zabfr}) - \\ l_r(F_{srl} - F_{zabrl} + F_{srr} - F_{zabrr}) + m_2 g \theta_y h_{yc} - m_2 G_x h_{yc} \quad (19)$$

[Expression 20]

$$\begin{cases} F_{sfl} = k_{sfl} z_{21fl} + c_{sfl} \dot{z}_{21fl} + k_{stf}(z_{21fl} - z_{21fr}) \\ F_{sfr} = k_{sfr} z_{21fr} + c_{sfr} \dot{z}_{21fr} + k_{stf}(z_{21fl} - z_{21fr}) \\ F_{srl} = k_{srl} z_{21rl} + c_{srl} \dot{z}_{21rl} + k_{str}(z_{21rl} - z_{21rr}) \\ F_{srr} = k_{srr} z_{21rr} + c_{srr} \dot{z}_{21rr} + k_{str}(z_{21rl} - z_{21rr}) \end{cases} \quad (20)$$

[Expression 21]

$$\begin{cases} z_{21fl} = z_{2fl} - z_{1fl} = \left(z_{2cg} + \frac{d_f}{2}\theta_x - l_f\theta_y\right) - z_{1fl} \\ z_{21fr} = z_{2fr} - z_{1fr} = \left(z_{2cg} - \frac{d_f}{2}\theta_x - l_f\theta_y\right) - z_{1fr} \\ z_{21rl} = z_{2rl} - z_{1rl} = \left(z_{2cg} + \frac{d_r}{2}\theta_x + l_r\theta_y\right) - z_{1rl} \\ z_{21rr} = z_{2rr} - z_{1rr} = \left(z_{2cg} - \frac{d_r}{2}\theta_x + l_r\theta_y\right) - z_{1rr} \end{cases} \quad (21)$$

Expression (16) is a motion equation regarding the vertical force acting on the sprung center of gravity (9). Expression (17) is a motion equation regarding the vertical force acting on unsprung. Expression (18) is a motion equation regarding the moment about the roll axis. Expression (19) is a motion equation regarding the moment about the pitch axis. Expression (20) is a balance expression of the vertical force acting between the sprung and unsprung. Expression (21) is a relational expression of the vertical relative displacement of the sprung and unsprung.

Here, hxc in Expression (18) is the lengths of the roll axis, which is the rotation center of the vehicle body 8 in the roll direction, and the sprung center of gravity 9, and hyc in Expression (19) is the lengths of the pitch axis, which is the rotation center of the vehicle body 8 in the pitch direction, and the sprung center of gravity 9.

In the series of relational expressions from Expressions (16) to (21), Expressions (16) to (20) are reflected in the finally obtained Expression (21), which is the relational expression of the vertical relative displacement of the sprung and unsprung, in which the plane motion-caused vertical forces Fzabfl, Fzabfr, Fzabrl, and Fzabrr of Expression (15) obtained by the vertical force estimation unit 52 are used.

Next, a vehicle body pitching-caused wheel speed Vwza, a suspension displacement-caused wheel speed Vwzb, and a ground load fluctuation-caused wheel speed Vwzc, which constitute the vertical motion-caused wheel speed component y, will be described with reference to FIGS. 9 to 12.

Note that FIGS. 9 to 12 are common to each wheel, and hence indices such as fl indicating the right and left wheels are omitted.

First, a specific example of the vehicle body pitching-caused wheel speed Vwza will be described. The vehicle body pitching-caused wheel speed Vwza will be explained using FIGS. 9 and 10 and Expressions (22) to (29).

Figure 9:
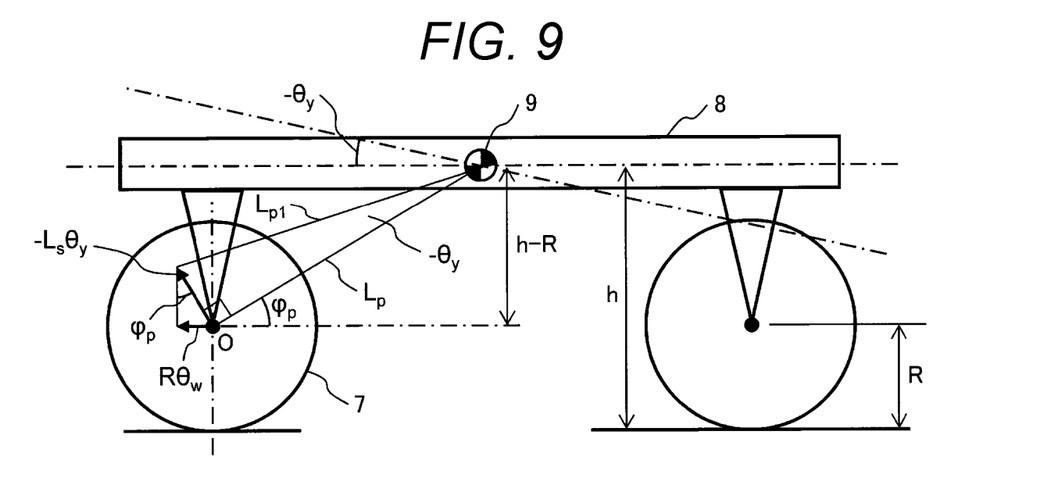
FIG. 9 is a view illustrating a wheel speed generated by vehicle body pitching according to the first embodiment.

FIG. 9 expresses a geometrical relationship between the pitching of the vehicle body 8 and the displacement of the wheel 7.

Here, O is the center of the wheel 7, h is the height of the sprung center of gravity 9, R is the tire radius, Lp is the length from the sprung center of gravity 9 to the center O of the wheel 7, Lp1 is the length from the sprung center of gravity 9 to the center O of the wheel 7 when pitching occurs in the vehicle body 8, Φp is the angle formed by the sprung center of gravity 9, the center O of the wheel 7, and a horizontal plane, θy is the vehicle body pitch angle, and θw is the rotation angle of the wheel 7.

Since Lp and Lp1 become approximately equal when the vehicle body pitch angle θy is small, a horizontal displacement Rθw of the wheel 7 is expressed by Expression (22) based on the length Lp from the sprung center of gravity 9 to the center O of the wheel 7, the vehicle body pitch angle θy, and the angle Φp formed by the sprung center of gravity 9, the center O of the wheel 7, and the horizontal plane.

[Expression 22]

$$R\theta_w = -L_p \theta_y \sin \varphi_p \tag{22}$$

Furthermore, sin Φp of Expression (22) is expressed by Expression (23) based on the height h of the sprung center of gravity 9, the tire radius R, and the length Lp from the sprung center of gravity 9 to the center O of the wheel 7.

[Expression 23]

$$\sin\varphi_p = \frac{h - R}{L_p} \tag{23}$$

Therefore, the vehicle body pitching-caused wheel speed Vwza is obtained by multiplying the sum of the differential value of the vehicle body pitch angle θy and the differential value of the rotation angle θw of the wheel 7 by the tire radius R, and is expressed by Expression (24).

[Expression 24]

$$V_{wza} = R(-\dot{\theta}_y + \dot{\theta}_w) = -h\dot{\theta}_y \tag{24}$$

Figure 10:
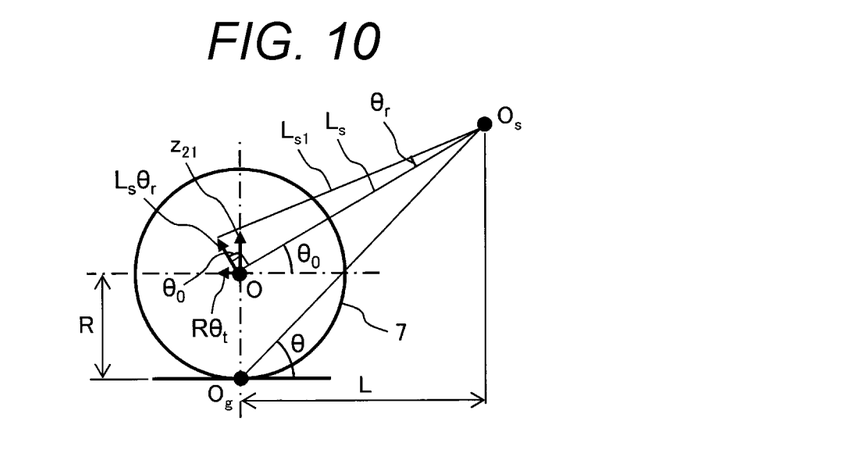
FIG. 10 is a view illustrating a wheel speed generated by displacement of a suspension according to the first embodiment.

Next, a specific example of the suspension displacement-caused wheel speed Vwzb will be described. FIG. 10 expresses a geometric relationship between the suspension displacement and the displacement of the wheel 7.

Here, Os is the instantaneous rotation center of the suspension, Og is a contact point between the wheel 7 and the road surface, O is the center of the wheel 7, R is the tire radius, Ls is the length from the instantaneous rotation center Os of the suspension to the center O of the wheel 7, Ls1 is the length from the instantaneous rotation center Os of the suspension to the center O of the wheel 7 when suspension displacement occurs, L is the horizontal length from the instantaneous rotation center Os of the suspension to the center O of the wheel 7, θ0 is an angle formed by the horizontal plane from the instantaneous rotation center Os of the suspension to the center O of the wheel 7, θ is an angle formed by the line connecting the instantaneous rotation center Os of the suspension and the contact point Og between the wheel 7 and the road surface and the horizontal plane, θt is a rotation angle of the wheel, and θr is a rotation angle of the fixed portion of the wheel speed sensor. In addition, z21 is suspension displacement and is referred to as relative displacement.

The horizontal displacement Rθt of the wheel 7 is expressed by Expression (25) based on the relative displacement z21 and the angle θ0 formed by the horizontal plane from the instantaneous rotation center Os of the suspension to the center O of the wheel 7.

[Expression 25]

$$R\theta_t = z_{21} \tan \theta_0 \tag{25}$$

Since Ls and Ls1 become approximately equal when the rotation angle θr of the fixed portion of the wheel speed sensor is small, rotation displacement Lsθr of the fixed portion of the wheel speed sensor around the instantaneous rotation center Os of the suspension is expressed by Expression (26) based on the relative displacement z21 and the angle θ0 formed by the horizontal plane from the instantaneous rotation center Os of the suspension to the center O of the wheel 7.

[Expression 26]

$$L_s \theta_r = \frac{z_{21}}{\cos\theta_0} \tag{26}$$

The length Ls from the instantaneous rotation center Os of the suspension to the center O of the wheel 7 is expressed by Expression (27) based on the horizontal length L from the instantaneous rotation center Os of the suspension to the center O of the wheel 7 and the angle θ0 formed by the horizontal plane from the instantaneous rotation center Os of the suspension to the center O of the wheel 7.

[Expression 27]

$$L_s = \frac{L}{\cos\theta_0} \tag{27}$$

Furthermore, the horizontal length L from the instantaneous rotation center Os of the suspension to the center O of the wheel 7 is expressed by Expression (28) based on the angle θ formed by the line connecting the instantaneous rotation center Os of the suspension and the contact point Og between the wheel 7 and the road surface and the horizontal plane, the angle θ0 formed by the horizontal plane from the instantaneous rotation center Os of the suspension to the center O of the wheel 7, and the tire radius R.

[Expression 28]

$$L \tan \theta = L \tan \theta_0 + R \tag{28}$$

Therefore, the suspension displacement-caused wheel speed Vwzb is obtained by multiplying the sum of the differential value of the rotation angle θr of the fixed portion of the wheel speed sensor, the rotational angular speed of the fixed portion of the wheel 7, and the differential value of the rotation angle θt of the wheel 7 by the tire radius R, and is expressed by Expression (29).

[Expression 29]

$$V_{wzb} = R(\dot{\theta}_r + \dot{\theta}_t) = \tan\theta \, \dot{z}_{21} \tag{29}$$

Next, a specific example of the ground load fluctuation-caused wheel speed Vwzc will be described. The ground load fluctuation-caused wheel speed Vwzc will be explained using FIGS. 11 and 12 and Expressions (30) to (33).

Figure 11:
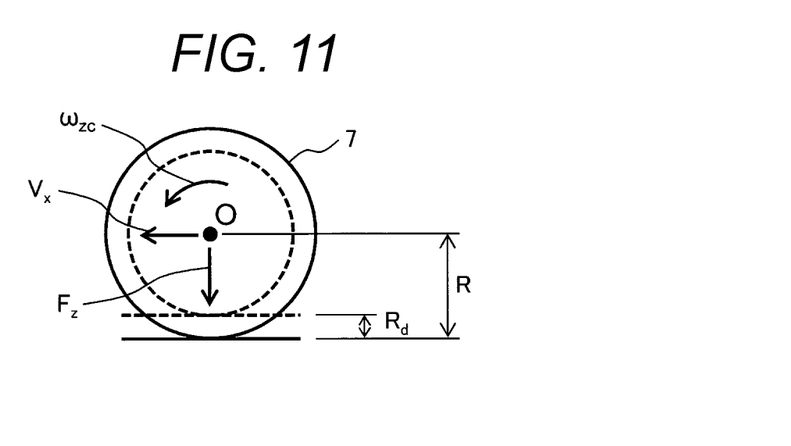
FIG. 11 is a view illustrating a wheel speed generated by ground load fluctuation according to the first embodiment.

FIG. 11 is a view illustrating a rotation wheel at a speed Vx at which the ground load Fz acts, and schematically expresses a situation in which as a fluctuation Fzd of the ground load acting on the wheel 7 increases, the tire effective rotation radius R decreases, whereby a rotation speed ωzc of the wheel 7 increases.

Here, when the wheel rotation speed ωzc caused by the ground load fluctuation is expressed by Expression (30) based on the speed Vx in the front-rear direction of the vehicle and the tire effective rotation radius R where a fluctuation amount of the tire effective rotation radius is Rd.

[Expression 28]

$$\omega_{zc} = \frac{V_x}{R + R_d} - \frac{V_x}{R} = -\frac{V_x}{R^2 + RR_d} R_d \cong -\frac{V_x}{R^2} R_d \tag{28}$$

Figure 12:
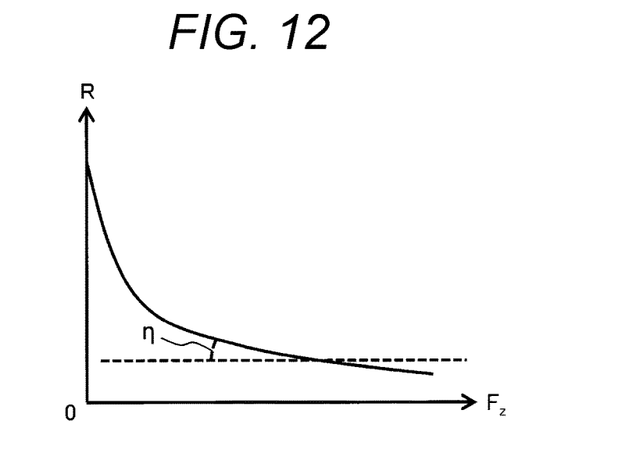
FIG. 12 is a view illustrating a relationship between ground contact load and a tire effective turning radius according to the first embodiment.

FIG. 12 is a characteristic diagram expressing the relationship between the ground load Fz and the tire effective rotation radius R.

When the fluctuation Fzd of the ground load is small, the relationship between the fluctuation Fzd of the ground load and the fluctuation Rd of the tire effective rotation radius becomes approximately linear.

Therefore, when the approximate gradient of the ground load Fz and the tire effective rotation radius R is η, the fluctuation Rd of the tire effective rotation radius is expressed by Expression (31) based on a tire vertical spring constant kt and the fluctuation Fzd of the ground load.

[Expression 31]

$$R_d = -\frac{\eta}{k_t} F_{zd} \quad (31)$$

The fluctuation Fzd of the ground load is expressed by Expression (32) based on the tire vertical spring constant kt, the road surface vertical displacement z0, the unsprung vertical displacement z1, or the unsprung mass m1, the second order differential value of the unsprung vertical displacement z1, the vertical force Fs acting between the sprung and unsprung, and the plane motion-caused vertical force Fzab.

[Expression 32]

$$F_{zd} = k_t(z_0 - z_1) = m_1 \ddot{z}_1 F_s - F_{zab} \quad (32)$$

Therefore, the ground load fluctuation-caused wheel speed Vwzc is obtained by substituting Expression (31) into Expression (30) and multiplying the result by the tire radius R, and is expressed by Expression (33).

[Expression 33]

$$V_{wzx} = R\omega_{zc} = \frac{\eta V_x}{k_t R} F_{zd} \quad (33)$$

Since the speed Vx in the front-rear direction of the vehicle of Expression (33) changes from moment to moment, it is necessary to consider the fluctuation of the vehicle speed in the front rear direction when using the linear observer including the time-invariant constant as described above.

Therefore, the vertical motion estimation unit 53 estimates the ground load fluctuation-caused wheel speed Vwzc based on Expression (33) with the speed Vx in the front-rear direction of the vehicle as input, and inputs it to the observer as the ground load fluctuation-caused wheel speed u (Vwzc).

Using the wheel speed components expressed by Expressions (22) to (33) described above, the vertical motion-caused wheel speed components Vwzfl, Vwzfr, Vwzrl, and Vwzrr are expressed by Expression (34). Expression (34) corresponds to Expression (1) in the vertical motion-caused wheel speed component estimation unit 51 of FIG. 2.

[Expression 34]

$$\begin{cases} V_{wzfl} = V_{wzafl} + V_{wzbfl} + V_{wzcfl} = -h\dot{\theta}_y + \tan\theta_{fl}\dot{z}_{21fl} + \frac{\eta_{fl}V_x}{k_{tfl}R_{fl}} F_{zdfl} \\ V_{wzfr} = V_{wzafr} + V_{wzbfr} + V_{wzcfr} = -h\dot{\theta}_y + \tan\theta_{fr}\dot{z}_{21fr} + \frac{\eta_{fr}V_x}{k_{tfr}R_{fr}} F_{zdfr} \\ V_{wzrl} = V_{wzarl} + V_{wzbrl} + V_{wzcrl} = -h\dot{\theta}_y + \tan\theta_{rl}\dot{z}_{21rl} + \frac{\eta_{rl}V_x}{k_{trl}R_{rl}} F_{zdrl} \\ V_{wzrr} = V_{wzarr} + V_{wzbrr} + V_{wzcrr} = -h\dot{\theta}_y + \tan\theta_{rr}\dot{z}_{21rr} + \frac{\eta_{rr}V_x}{k_{trr}R_{rr}} F_{zdrr} \end{cases} \quad (34)$$

The vertical motion estimation unit 53 converts the equations of Expressions (16) to (34) into state equations based on the vertical motion-caused wheel speed component y, the plane motion-caused vertical force u (Fzd), the ground load fluctuation-caused wheel speed u (Vwzc), and the vertical motion state amount x, and estimates and outputs the vertical motion state amount x from the vertical motion-caused wheel speed component y, the plane motion-caused vertical force u (Fzab), and the ground load fluctuation-caused wheel speed u (Vwzc) by the observer based on the state equations.

The state equation is expressed by Expression (35).

[Expression 35]

$$\begin{cases} \dot{x} = Ax + Bu + Gv \\ y = Cx + Du + Hw \end{cases} \quad (35)$$

Here, A in Expression (35) is a state matrix, B is an input matrix, C is an output matrix, D is a direct matrix, Gv is a system noise term, and Hw is an observation noise term.

Among the elements of the state equation shown in Expression (35), the vertical motion state amount x, the vertical motion-caused wheel speed component y, the plane motion-caused vertical force u (Fzab), and the ground load fluctuation-caused wheel speed u (Vwzc) are expressed by Expression (36).

[Expression 36]

$$\begin{cases} x = [z_{1fl} \ z_{1fr} \ z_{1rl} \ z_{1rr} \ z_{2cg} \ \theta_x \ \theta_y \ \dot{z}_{1fl} \ \dot{z}_{1fr} \ \dot{z}_{1rl} \ \dot{z}_{1rr} \ \dot{z}_{2cg} \ \dot{\theta}_x \ \dot{\theta}_y]^T \\ y = [V_{wzfl} \ V_{wzfr} \ V_{wzrl} \ V_{wzrr}]^T \\ u = [F_{zabfl} \ F_{zabfr} \ F_{zabrl} \ F_{zabrr} \ V_{wzcfl} \ V_{wzcfr} \ V_{wzcrl} \ V_{wzcrr}]^T \end{cases} \quad (36)$$

The state matrix A, the input matrix B, and the like are configured by arranging each state amount and the coefficients such as u and v.

In short, the vertical motion estimation unit 53 of FIG. 2 estimates the state amount of vertical motion of the vehicle based on the wheel speed component from the vertical motion-caused wheel speed component estimation unit and the vertical force acting on the vehicle body from the vertical force estimation unit.

The above is an example of the estimation method of the vertical motion state amount of the vehicle according to the present invention. By using the vehicle motion state estimation device 50 having such a configuration, it is possible to accurately estimate the accurate vertical motion state amount by using a sensor generally mounted on a vehicle such as a wheel speed sensor and a vehicle dynamics model, regardless of travel conditions such as constant speed, acceleration/deceleration, straight travel, and turning.

Next, an example of the processing result of the vehicle motion state estimation device 50 will be described with reference to FIG. 13.

Figure 13:
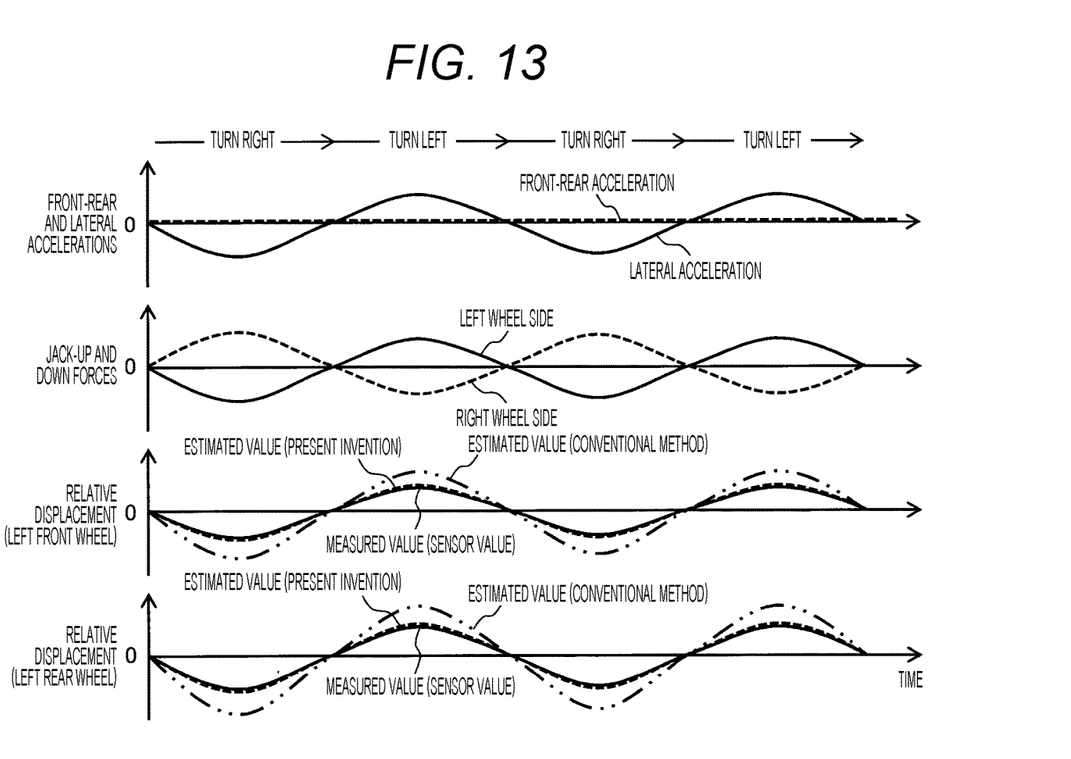
FIG. 13 is a view illustrating a temporal change of a processing result by the vehicle vertical momentum estimation device 50 according to the first embodiment.

FIG. 13 is a view presenting an example of temporal changes of front-rear acceleration, lateral acceleration, jack-up force, jack-down force, and relative displacement of the left front wheel and the left rear wheel when slalom travel is performed in order from the top.

The front-rear acceleration and the lateral acceleration presented in FIG. 13 are measured values detected using the acceleration sensor or the like, and the jack-up force and the jack-down force are estimated values of the vehicle motion state estimation device 50 of the present invention.

The solid line of the relative displacement shown in FIG. 13 is a measured value detected by using a dedicated sensor such as a vehicle height sensor, the two-dot chain line is an estimated value by a conventional method not in consideration of the plane motion-caused vertical force such as jack-up force, and the dashed line is an estimated value of the vehicle motion state estimation device 50 of the present invention in consideration of the plane motion-caused vertical force such as jack-up force.

The estimated value of relative displacement by the conventional method not in consideration of the plane motion-caused vertical force such as jack-up force presented in FIG. 13 has a large amplitude error with the measured value.

On the other hand, the estimated value of relative displacement of the present invention in consideration of the plane motion-caused vertical force such as jack-up force is approximately equal to the measured value, and it is possible to perform estimation with higher accuracy than that of the conventional method.

Second Embodiment

In the second embodiment, differences from the first embodiment will be mainly described, and the description of the same parts as in the first embodiment will be omitted.

The main difference between the second embodiment and the first embodiment lies in configuration of the vehicle 10 in which the suspension control unit 81 and a control suspension device 82 are added, and the processing outline of the suspension control unit 81 mainly in the second embodiment will be described with reference to FIGS. 14 and 15.

Figure 14:
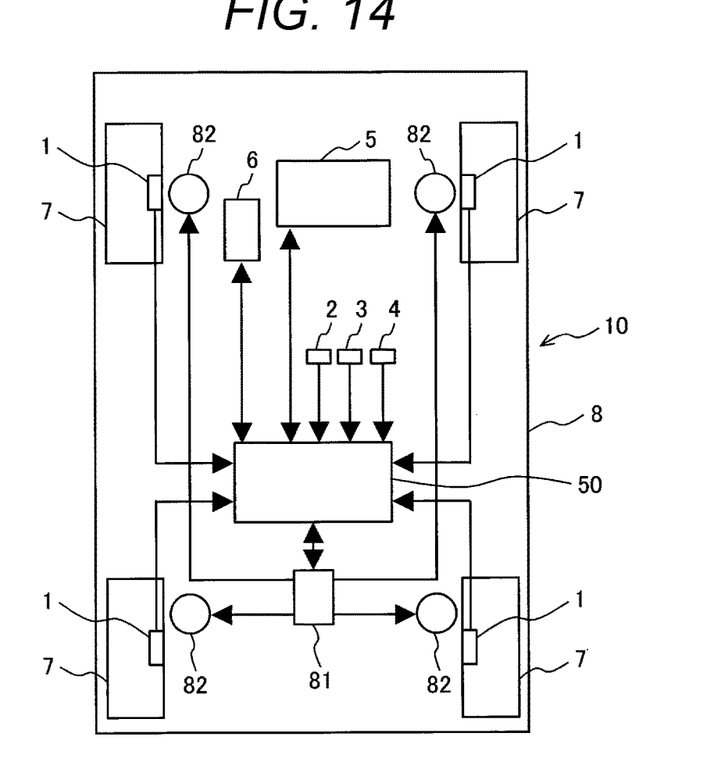
FIG. 14 is a view illustrating a configuration example of a vehicle on which a vehicle vertical motion state estimation device 50 according to a second embodiment is mounted.

FIG. 14 illustrates a configuration view of the vehicle 10 on which the vehicle motion state estimation device 50 according to the second embodiment is mounted.

FIG. 14 presents the configuration in which the suspension control unit 81 and the control suspension device 82 are added to the configuration of FIG. 1.

The control suspension device 82 is a damping force adjustment type shock absorber capable of adjusting damping characteristics or an active suspension capable of adjusting vertical force between the vehicle body and the wheel.

The suspension control unit 81 generates a control command value for controlling the damping characteristic of the control suspension device 82 or the vertical force based on the detected value of the acceleration sensor 2, the gyro sensor 3, and the like and the estimated value of the sprung vertical speed estimated by the vehicle motion state estimation device 50.

Here, in a case of applying the vehicle motion state estimation device 50 to the control suspension device 82, suspension damping coefficients csfl, csfr, csrl, and csrr become variable. Hence, it is necessary to consider a change in damping force if the vertical motion estimation unit 53 is a linear observer including a time-invariant constant.

Expression (37) expresses the damping force term by the suspension damping coefficient in Expression (20) of the first embodiment separated into the damping force term by steady damping coefficients csf and csr and the terms of damping force changes Fcdfl, Fcdfr, Fcdrl, and Fcdrr caused by the differences.

[Expression 37]

$$\begin{cases} F_{sfl} = k_{sfl}z_{21fl} + c_{sf}\dot{z}_{21fl} + (c_{sfl} - c_{sf})\dot{z}_{21fl} + k_{stf}(z_{21fl} - z_{21fr}) \\ \quad = k_{sfl}z_{21fl} + c_{sf}\dot{z}_{21fl} + k_{stf}(z_{21fl} - z_{21fr}) + F_{cdfl} \\ F_{sfr} = k_{sfr}z_{21fr} + c_{sf}\dot{z}_{21f} + (c_{sfr} - c_{sf})\dot{z}_{21fr} + k_{stf}(z_{21fl} - z_{21fr}) \\ \quad = k_{sfr}z_{21fr} + c_{sf}\dot{z}_{21f} + k_{stf}(z_{21fl} - z_{21fr}) + F_{cdfr} \\ F_{srr} = k_{srr}z_{21rr} + c_{sr}\dot{z}_{21r} + (c_{srr} - c_{sr})\dot{z}_{21rr} + k_{str}(z_{21rl} - z_{21rr}) \\ \quad = k_{srr}z_{21rr} + c_{sr}\dot{z}_{21r} + k_{str}(z_{21rl} - z_{21rr}) + F_{cdrr} \end{cases} \quad (37)$$

That is, the vertical motion estimation unit 53 estimates the damping force change Fcd based on Expression (37) using the differential value of the relative displacement z21 as input, and inputs it to the observer as the damping force change u (Fcd).

Note that Expression (38) expresses u of Expression (36) of the first embodiment to which the damping force change u (Fcd) is added.

[Expression 38]

$$u = [F_{zafbl}F_{zabfr}F_{zabrl}F_{zabrr}V_{wzcfl}V_{wzcfr}V_{wzcrl}V_{wzcrr} \\ F_{cdfl}F_{cdfr}F_{cdrl}F_{cdrr}]^T \quad (38)$$

By using the vehicle motion state estimation device 50 having the above-described configuration, it is possible to reduce the calculation load of the vehicle motion state estimation device 50, and it is possible to realize estimation of the vehicle motion state using a less expensive computer.

Next, as an example of the control by the suspension control 81, a processing outline of the damping control will be described with reference to FIG. 15.

Figure 15:
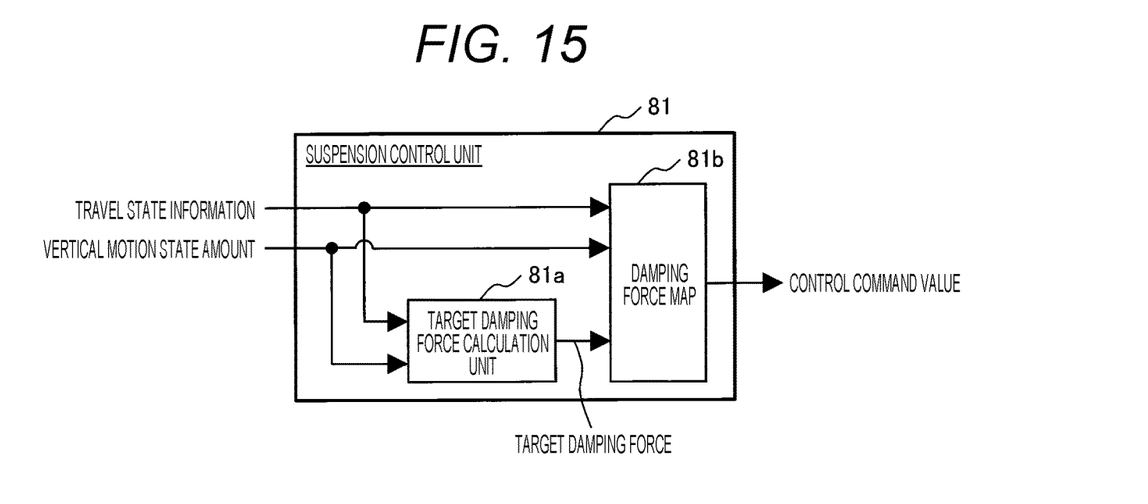
FIG. 15 is a view illustrating a conceptual configuration example of a suspension control unit 81 according to the second embodiment.

FIG. 15 is a conceptual view of the suspension control unit 81 that performs damping control, which is a function of the control suspension device 82 in the second embodiment.

The travel state information detected or estimated by the acceleration sensor 2, the gyro sensor 3, or the like, and the vertical motion state amount estimated by the vehicle motion state estimation device 50 are input to the suspension control unit 81.

The suspension control unit 81 includes a target damping force calculation unit 81*a* and a damping force map 81*b*.

The target damping force calculation unit 81a calculates the target damping force of the control suspension device 82 based on the travel state information and the vertical motion state amount.

The damping force map 81b is map information of the characteristics of the control suspension device 82 stored in advance, and derives and outputs a control command value for controlling the control suspension device 82 using, as input, the target damping force calculated by the target damping force calculation unit 81a, the travel state information, and the vertical motion state amount.

With the above configuration, even a vehicle including a suspension adjusting the damping characteristics or capable of adjusting the vertical force between the vehicle body and the wheel can realize highly accurate estimation of vertical motion state amount and high performance damping control using it.

REFERENCE SIGNS LIST 1 wheel speed sensor
2 acceleration sensor
3 gyro sensor
4 steering angle sensor
5 brake/drive control unit
6 steering control unit
7 wheel
8 vehicle body
8 sprung center of gravity
10 vehicle
11 instantaneous rotation center
50 vehicle motion state estimation device
51 vertical motion-caused wheel speed component estimation unit
52 vertical force estimation unit
53 vertical motion estimation unit
81 suspension control unit
81a target damping force calculation unit
81b damping force map
82 control suspension device

The invention claimed is:

1. A vehicle motion state estimation device in a vehicle in which a wheel and a vehicle body are coupled via a suspension, the vehicle motion state estimation device, comprising:
a computer configured to:
estimate a wheel speed component caused by vertical motion of the vehicle;
calculate a vertical force in which a frictional force of the wheel caused by motion of the vehicle acts on the vehicle body by geometry of the suspension by multiplying front-rear acceleration and/or lateral acceleration of the vehicle by a constant, wherein the constant is a proportional coefficient based on an angle formed by a line connecting a horizontal axis, an instantaneous rotation center of the suspension, and an acting point of the frictional force on a ground surface of the wheel; and
estimate a state amount of vertical motion of the vehicle based on a wheel speed and the vertical force acting on the vehicle body.

2. The vehicle motion state estimation device according to claim 1, wherein the computer is further configured to:
estimate the vertical force caused in the vehicle body by multiplying a second frictional force acting in a front-rear direction or lateral direction of the wheel by a second constant.

3. The vehicle motion state estimation device according to claim 1, wherein the computer is further configured to:
estimate the vertical force caused in the vehicle body by using a characteristic diagram that outputs the vertical force caused in the vehicle body using front-rear acceleration or lateral acceleration of the vehicle as input.

4. The vehicle motion state estimation device according to claim 3, wherein the characteristic diagram is a linear or nonlinear map based on an angle formed by a line connecting a horizontal axis, an instantaneous rotation center of the suspension, and an acting point of a second frictional force on a ground surface of the wheel.

5. The vehicle motion state estimation device according to claim 1, wherein the computer is further configured to:
estimate the vertical force caused in the vehicle body by using a characteristic diagram that outputs the vertical force caused in the vehicle body using a second frictional force acting in a front-rear direction or lateral direction of the wheel as input.

6. The vehicle motion state estimation device according to claim 1, wherein the front-rear acceleration or the lateral acceleration of the vehicle are values corrected based on output of the computer.

7. The vehicle motion state estimation device according to claim 1, wherein the lateral acceleration of the vehicle is estimated from a front-rear speed and a yaw rate of the vehicle.

8. The vehicle including the vehicle motion state estimation device according to claim 1, comprising a suspension control device to which a state amount estimated by the computer is input controls force generated in the suspension based on the state amount.

9. A vehicle motion state estimation method in a vehicle in which a wheel and a vehicle body are coupled via a suspension, the vehicle motion state estimation method, comprising
estimating, by a computer, a state amount of vertical motion of the vehicle based on a vertical motion of the vehicle and a vertical force in which frictional force of the wheel caused by motion of the vehicle acts on the vehicle body by geometry of the suspension, the vertical force calculated by multiplying front-rear acceleration and/or lateral acceleration of the vehicle by a constant, wherein the constant is a proportional coefficient based on an angle formed by a line connecting a horizontal axis, an instantaneous rotation center of the suspension, and an acting point of the frictional force on a ground surface of the wheel.

* * * * *